(12) United States Patent
Nagai et al.

(10) Patent No.: US 11,691,595 B2
(45) Date of Patent: Jul. 4, 2023

(54) VEHICLE CONTROL SYSTEM, MOBILE TERMINAL, AND IN-VEHICLE DEVICE

(71) Applicant: DENSO CORPORATION, Kariya (JP)

(72) Inventors: Nobuyoshi Nagai, Kariya (JP); Nobuyasu Okabe, Kariya (JP)

(73) Assignee: DENSO CORPORATION, Kariya (JP)

( * ) Notice: Subject to any disclaimer, the term of this patent is extended or adjusted under 35 U.S.C. 154(b) by 55 days.

(21) Appl. No.: 17/404,654

(22) Filed: Aug. 17, 2021

(65) Prior Publication Data

US 2021/0370876 A1 Dec. 2, 2021

Related U.S. Application Data

(63) Continuation of application No. PCT/JP2020/009405, filed on Mar. 5, 2020.

(30) Foreign Application Priority Data

Mar. 5, 2019 (JP) ................................ 2019-039555

(51) Int. Cl.
*B60R 25/24* (2013.01)
*B60R 25/01* (2013.01)
*G07C 9/00* (2020.01)

(52) U.S. Cl.
CPC ............ *B60R 25/245* (2013.01); *B60R 25/01* (2013.01); *G07C 9/00309* (2013.01); *B60R 2325/205* (2013.01); *G07C 2009/00769* (2013.01); *G07C 2209/63* (2013.01)

(58) Field of Classification Search
None
See application file for complete search history.

(56) References Cited

U.S. PATENT DOCUMENTS

| 9,875,591 | B2 * | 1/2018 | Watters | H04W 4/80 |
| 9,894,492 | B1 * | 2/2018 | Elangovan | H04W 4/023 |
| 10,585,431 | B2 * | 3/2020 | Golgiri | B62D 15/0285 |
| 10,706,650 | B2 * | 7/2020 | Tamane | B60R 25/2045 |
| 10,981,541 | B2 * | 4/2021 | Golduber | B60R 25/1009 |

(Continued)

FOREIGN PATENT DOCUMENTS

| JP | 2011-247076 A | 12/2011 |
| JP | 2015169008 A | 9/2015 |

(Continued)

*Primary Examiner* — Carlos Garcia
(74) *Attorney, Agent, or Firm* — Harness, Dickey & Pierce, P.L.C.

(57) ABSTRACT

A vehicle control system includes an in-vehicle device, a mobile terminal, and one or more processors. The in-vehicle device is mounted on a vehicle. The in-vehicle device controls a lock mechanism that locks and unlocks a door of the vehicle. The in-vehicle device causes the lock mechanism to unlock the door in response to a predetermined condition being satisfied. The mobile terminal communicates with the in-vehicle device. The one or more processors determine whether the mobile terminal is present inside a vehicle compartment. The one or more processors detect whether the mobile terminal is used. The one or more processors control the vehicle control system not to satisfy the predetermined condition in response to determination that the mobile terminal is present inside the vehicle compartment.

7 Claims, 10 Drawing Sheets

(56) References Cited

U.S. PATENT DOCUMENTS

| | | | |
|---|---|---|---|
| 11,228,882 B2* | 1/2022 | You | H04W 64/003 |
| 11,402,485 B2* | 8/2022 | Jain | G01S 13/0209 |
| 11,403,638 B2* | 8/2022 | Hassani | G06Q 20/16 |
| 11,420,593 B2* | 8/2022 | Moeller | G06F 21/572 |
| 11,427,158 B2* | 8/2022 | Cho | B60R 25/04 |
| 11,447,100 B2* | 9/2022 | Kano | B60R 25/2018 |
| 2009/0096578 A1* | 4/2009 | Ogino | B60R 25/245 |
| | | | 340/5.72 |
| 2014/0217816 A1* | 8/2014 | Okada | H02J 50/80 |
| | | | 307/10.1 |
| 2014/0232569 A1* | 8/2014 | Skinder | G08G 1/144 |
| | | | 340/989 |
| 2015/0228191 A1* | 8/2015 | Steinmetz | G08G 1/0968 |
| | | | 340/988 |
| 2019/0204825 A1* | 7/2019 | Golgiri | G05D 1/0055 |
| 2020/0309932 A1* | 10/2020 | Zeng | H01Q 1/3241 |

FOREIGN PATENT DOCUMENTS

| | | | |
|---|---|---|---|
| JP | 2015231090 A | | 12/2015 |
| KR | 10-2015-0064910 A | | 6/2015 |

\* cited by examiner

VEHICLE CONTROL SYSTEM, MOBILE TERMINAL, AND IN-VEHICLE DEVICE

CROSS REFERENCE TO RELATED APPLICATIONS

The present application is a continuation application of International Patent Application No. PCT/JP2020/009405 filed on Mar. 5, 2020, which designated the U.S. and claims the benefit of priority from Japanese Patent Application No. 2019-039555 filed on Mar. 5, 2019. The entire disclosures of all of the above applications are incorporated herein by reference.

TECHNICAL FIELD

The present disclosure relates to a system that controls door lock of a vehicle.

BACKGROUND

A smart entry system that can lock and unlock a vehicle door or the like by a key device capable of wireless communication has been known. For example, a technique for improving security by using a smartphone has been proposed.

SUMMARY

The present disclosure provides a vehicle control system. The vehicle control system includes an in-vehicle device, a mobile terminal, and one or more processors. The in-vehicle device is mounted on a vehicle. The in-vehicle device controls a lock mechanism that locks and unlocks a door of the vehicle. The in-vehicle device causes the lock mechanism to unlock the door in response to a predetermined condition being satisfied. The mobile terminal communicates with the in-vehicle device. The one or more processors determine whether the mobile terminal is present inside a vehicle compartment. The one or more processors detect whether the mobile terminal is used. The one or more processors control the vehicle control system not to satisfy the predetermined condition in response to determination that the mobile terminal is present inside the vehicle compartment.

BRIEF DESCRIPTION OF DRAWINGS

The features and advantages of the present disclosure will become more apparent from the following detailed description made with reference to the accompanying drawings. In the drawings.

DETAILED DESCRIPTION

Figure 1:
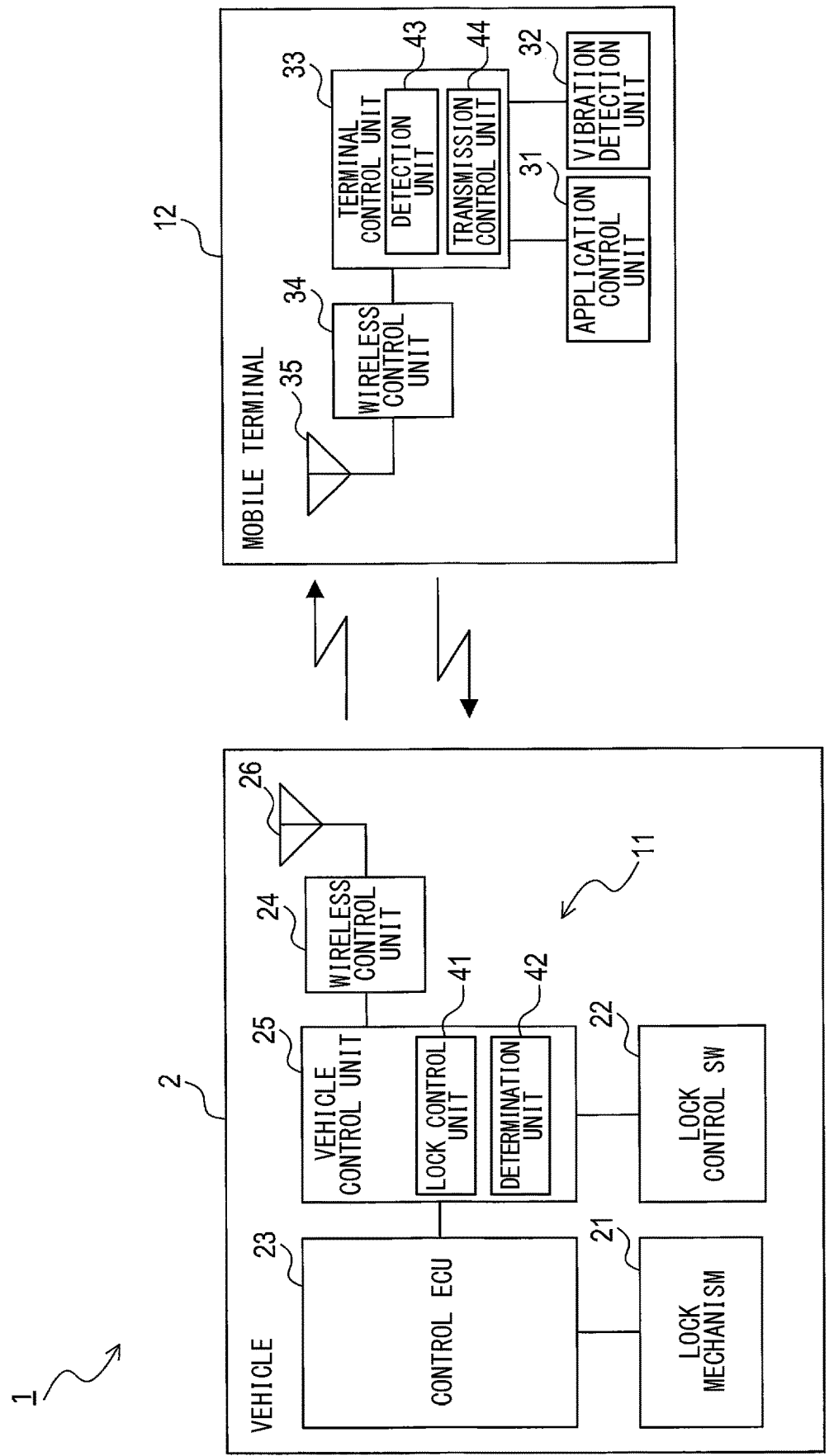
FIG. 1 is a block diagram showing a configuration of a vehicle control system according to a first embodiment.

For example, the inventor of the present application is considering a system in which a mobile terminal such as a smartphone is used and the mobile terminal is used instead of a key device. As a result of detailed examination by the inventor, the following difficulties were found.

When there are a plurality of mobile terminals each used as a key device and one of them is determined to be outside the vehicle compartment, it is desirable that a mobile terminal determined to be inside the vehicle compartment temporarily stops functioning as a key device. This is because when a mobile terminal is left inside the vehicle compartment, there is a risk of unintentional unlocking by a third party. It is assumed that it is determined that a mobile terminal is inside the vehicle compartment but the mobile terminal actually exists outside the vehicle. In this case, if functions of the mobile terminal is stopped, the door cannot be unlocked using this mobile terminal as a key device. The configuration may reduce convenience of the system.

The present disclosure provides a vehicle control system, a mobile terminal, and an in-vehicle device each suppresses a decrease in convenience of unlocking a door.

An exemplary embodiment of the present disclosure provides a vehicle control system that includes an in-vehicle device and a mobile terminal. The in-vehicle device is mounted on a vehicle. The mobile terminal communicates with the in-vehicle device. The in-vehicle device includes a lock control unit configured to control a lock mechanism that locks and unlocks a door of the vehicle, and cause the lock mechanism to unlock the door in response to a predetermined condition being satisfied. The vehicle control system further includes a determination unit, a detection unit, and a system control unit. The determination unit determines whether the mobile terminal is present inside a vehicle compartment. The detection unit detects whether the mobile terminal is used. The system control unit controls the vehicle control system not to satisfy the predetermined condition in response to the determination unit determining that the mobile terminal is present inside the vehicle compartment. The system control unit enables the vehicle control system to satisfy the predetermined condition in response to the detection unit detecting that the mobile terminal is used when the system control unit controls the vehicle control system not to satisfy the predetermined condition.

In the exemplary embodiment of the present disclosure, when the mobile terminal is present inside the vehicle compartment, the configuration prohibits unlock of the door using the mobile terminal until the use of the mobile terminal is detected.

Therefore, the configuration can suppress unlocking of a third party using the mobile terminal placed inside the vehicle compartment, and suppress a decrease in convenience due to an erroneous determination of the position of the mobile terminal.

Another exemplary embodiment of the present disclosure provides a mobile terminal that communicates with an in-vehicle device mounted on a vehicle. The vehicle device includes a lock control unit and a determination unit. The lock control unit controls a lock mechanism that locks and unlocks a door of the vehicle. The determination unit determines whether the mobile terminal is present inside a vehicle compartment. The mobile terminal includes a detection unit and a transmission control unit. The detection unit detects whether the mobile terminal is used. The transmission control unit transmits a permission signal that permits the lock mechanism to unlock the door in response to a predetermined transmission condition being satisfied. When the determination unit determines that the mobile terminal is present inside the vehicle compartment, the transmission control unit stops transmitting the permission signal until the detection unit detects that the mobile terminal is used.

In another exemplary embodiment of the present disclosure, when the mobile terminal is present inside the vehicle compartment, the configuration stops the mobile terminal from transmitting the signal for unlocking the door until the use of the mobile terminal is detected.

Therefore, the configuration can suppress unlocking of a third party using the mobile terminal placed inside the vehicle compartment, and suppress a decrease in convenience due to an erroneous determination of the position of the mobile terminal.

Another exemplary embodiment of the present disclosure provides an in-vehicle device that is mounted on a vehicle and constitutes a vehicle control system with a mobile terminal configured to communicate with the in-vehicle device. The vehicle device includes a lock control unit and a determination unit. The lock control unit controls a lock mechanism that locks and unlocks a door of the vehicle, and cause the lock mechanism to unlock the door in response to a predetermined condition being satisfied. The determination unit determines whether the mobile terminal is present inside a vehicle compartment. The vehicle control system includes a detection unit and a system control unit. The detection unit detects whether the mobile terminal is used. The system control unit controls the vehicle control system not to satisfy the predetermined condition in response to the determination unit determining that the mobile terminal is present inside the vehicle compartment. The system control unit enables the vehicle control system to satisfy the predetermined condition in response to the detection unit detecting that the mobile terminal is used when the system control unit controls the vehicle control system not to satisfy the predetermined condition.

In another exemplary embodiment of the present disclosure, when the mobile terminal is present inside the vehicle compartment, the configuration stops the in-vehicle device from unlocking the door until the use of the mobile terminal is detected.

Therefore, the configuration can suppress unlocking of a third party using the mobile terminal placed inside the vehicle compartment, and suppress a decrease in convenience due to an erroneous determination of the position of the mobile terminal.

Embodiments of the present disclosure will be described below with reference to the drawings.

1. First Embodiment

1-1. Configuration

A vehicle control system 1 shown in FIG. 1 includes an in-vehicle device 11 mounted on a vehicle 2 and a mobile terminal 12 capable of communicating with the in-vehicle device 11.

The in-vehicle device 11 includes a lock mechanism 21, a lock control switch 22, a control ECU 23, a wireless control unit 24, a vehicle control unit 25, and an antenna 26.

The lock mechanism 21 is a mechanism for realizing lock (that is, lock) and unlock (that is, unlock) in one of a plurality of doors and trunks. The in-vehicle device 11 may include a lock mechanism 21 corresponding to each of the plurality of doors and trunks included in the vehicle 2. Note that FIG. 1 shows one lock mechanism 21. Although not shown, the lock mechanism 21 may include a mechanism for switching between locking and unlocking, and a drive device for driving the mechanism.

The lock control switch 22 is a switch operated by the user when locking or unlocking the door or trunk. The switch can be configured with, for example, a button to be pushed by a user, a contact sensor, a proximity sensor that detects proximity of a hand, or the like. The lock control switch 22 is connected to the wireless control unit 24, and outputs a signal to the wireless control unit 24 when a user's operation is detected. An operation for locking and an operation for unlocking may be different or the same. Similarly to the lock mechanism 21, the in-vehicle device 11 may include a plurality of lock control switches 22 in the vehicle 2. In FIG. 1, one lock control switch 22 is shown. The lock control switch 22 corresponds to an operation unit.

The control ECU 23 controls the locking and unlocking of the door or trunk by driving the drive device of the lock mechanism 21 in response to a control signal transmitted from the vehicle control unit 25.

The wireless control unit 24 is a communication module for the vehicle control unit 25 to perform wireless communication with the mobile terminal 12. In this embodiment, the wireless control unit 24 is a module for performing communication by Bluetooth Low Energy (BLE). Bluetooth is a registered trademark. The wireless control unit 24 is capable of communicating with a device separated by about several tens of meters. When the vehicle control unit 25 communicates with the mobile terminal 12 by a plurality of communication methods, a plurality of modules corresponding to the communication methods may be arranged. For example, the wireless control unit 24 may further include a module that performs another communication module of an RF signal, an LF signal, or a communication method other than Bluetooth.

The vehicle control unit 25 includes a microcomputer having a CPU and a semiconductor memory such as a RAM or a ROM. Functions provided by the vehicle control unit 25 are implemented by the CPU executing a program stored in a non-transitory tangible storage medium. In the present example, the semiconductor memory corresponds to the non-transitory tangible storage medium in which the program is stored. When the program is executed, a method corresponding to the program is executed. The vehicle control unit 25 may include one or more microcomputers. The vehicle control unit 25 includes a lock control unit 41 and a determination unit 42.

The lock control unit 41 controls the lock mechanism 21 that locks and unlocks the door of the vehicle 2. Specifically, the lock control unit 41 transmits a control signal to the control ECU 23 to operate the lock mechanism 21. In addition, when performing unlock, it is necessary to satisfy predetermined conditions. The requirements for satisfying the predetermined conditions include (i) reception of a predetermined input operation to the lock control switch 22 mounted on the vehicle 2 and (ii) reception of a permission signal that permits the lock mechanism 21 to unlock the door from the mobile terminal 12.

The determination unit 42 determines whether the mobile terminal 12 is present in a vehicle compartment of the vehicle 2. A specific determination method will be described with reference to FIG. 2. The antenna 26 for communicating with mobile terminals 12a to 12c is arranged at a position substantially in the center of the vehicle 2 when the vehicle 2 is viewed from above. The determination unit 42 calculates distance from the antenna 26 to the mobile terminal 12 based on intensity of radio wave received from the mobile terminal 12. The specific method for obtaining the distance between two points based on the intensity of radio wave is not limited, and various known techniques can be adopted. The method for determining whether the mobile terminal 12 is present in the vehicle compartment is not limited to the method based on the intensity of radio wave. For example, whether the mobile terminal 12 is present in the vehicle compartment may be determined by comparing the position of the mobile terminal 12 with the position of the vehicle 2.

Figure 2:
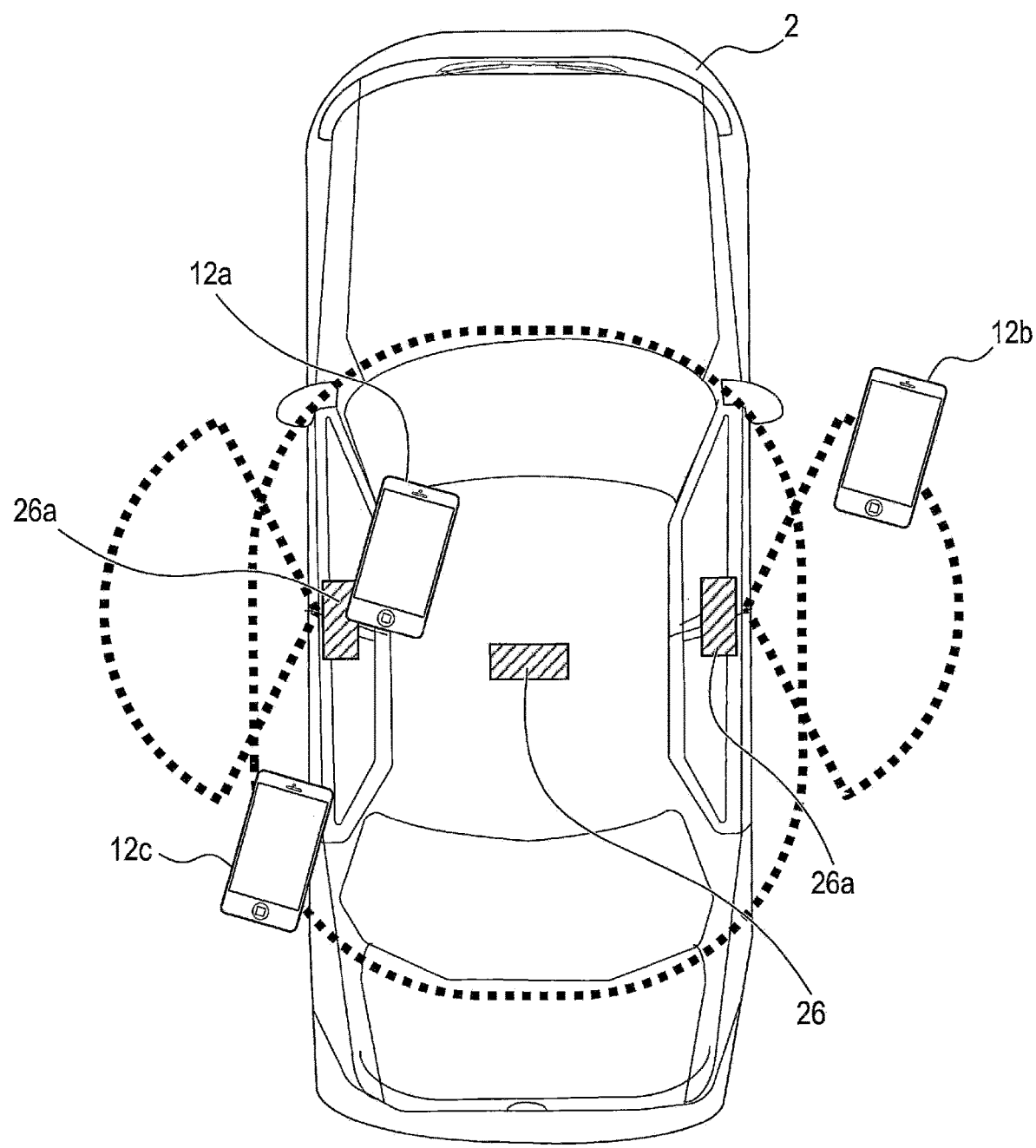
FIG. 2 is a diagram showing a method of determining a position of a mobile terminal.

Further, as described above, BLE communication is used for communication between the in-vehicle device 11 and the mobile terminal 12. Alternatively, a communication method using an RF signal or an LF signal may be used for performing the above described determination when a module for performing the communication method using an RF signal or an LF signal is provided. For example, as shown in FIG. 2, in addition to the antenna 26, one or more antennas 26a may be arranged on the side surface of the vehicle 2 or the like so as to detect a more detailed position. In the example of FIG. 2, by using the antennas 26a, it can be determined more accurately that the mobile terminal 12b does not exist in the vehicle compartment.

Return to the description of FIG. 1. The mobile terminal 12 includes a terminal control unit 33, an application control unit 31, a vibration detection unit 32, a wireless control unit 34, and an antenna 35. The mobile terminal 12 may be a smartphone or a tablet capable of executing various applications. The mobile terminal 12 may include a display, a touch sensor, or the like (not shown).

The application control unit 31 executes various applications that can be executed by the mobile terminal 12.

The vibration detection unit 32 is configured to detect vibration applied to the mobile terminal 12. The vibration detection unit 32 may include, for example, an acceleration sensor. The vibration detection unit 32 outputs a signal corresponding to the vibration applied to the mobile terminal 12 to the terminal control unit 33.

The terminal control unit 33 includes a microcomputer having a CPU and a semiconductor memory such as a RAM or a ROM. Functions provided by the terminal control unit 33 are implemented by the CPU executing a program stored in a non-transitory tangible storage medium. In the present example, the semiconductor memory corresponds to the non-transitory tangible storage medium in which the program is stored. When the program is executed, a method corresponding to the program is executed. The vehicle control unit 25 may include one or more microcomputers. The terminal control unit 33 includes a detection unit 43 and a transmission control unit 44.

The detection unit 43 is configured to detect that the mobile terminal 12 is used. Specifically, the detection unit 43 detects that the mobile terminal 12 is used in response to execution of the application of the application control unit 31 corresponding to the user's operation. Further, the detection unit 43 detects that the mobile terminal 12 is used in response to moving of the mobile terminal 12 based on a signal acquired from the vibration detection unit 32. The detection unit 43 may detect the use of the mobile terminal 12 by a method other than the above method. For example, the mobile terminal 12 may be configured to detect one of execution of the application and moving of the mobile terminal 12, or may be configured to detect the use of the mobile terminal 12 based on other information.

The transmission control unit 44 is configured to transmit a permission signal for permitting the lock mechanism 21 to unlock the door to the in-vehicle device 11 when a predetermined transmission condition is satisfied. The requirements for satisfying the predetermined transmission condition include at least receiving an unlock command described later. The detailed control of the transmission control unit 44 will be described later.

The wireless control unit 34 is a module for realizing communication with the wireless control unit 24. Therefore, the wireless control unit 34 is capable of executing the communication method executed by the wireless control unit 24. The wireless control unit 34 communicates using the antenna 35.

The vehicle control system 1 described above includes a wireless authentication function (a function of a so-called smart entry start system) that enables lock and unlock of a door without using a mechanical key. The mobile terminal 12 is a key device having a wireless authentication function. When the mobile terminal 12 approaches the in-vehicle device 11 and the mobile terminal 12 is authenticated, the lock control or the unlock control are realized due to the user performing a predetermined operation on the lock control switch 22. In the following description, the lock control indicates that the control ECU 23 operates the lock mechanism 21 in response to a command from the vehicle control unit 25 to lock the door or the like. The unlock control indicates that the control ECU 23 operates the lock mechanism 21 in response to a command from the vehicle control unit 25 to unlock the door or the like.

1-2. Processing of Vehicle Control System

The vehicle control system 1 improves safety of unlocking by the processing executed by the vehicle control unit 25 and the wireless control unit 34. In the following processing, the authentication of the mobile terminal 12 by the in-vehicle device 11 is not mentioned, but the lock control and the unlock control may be executed on condition that the authentication of the mobile terminal 12 is established.

1-2-1. Lock Reception Processing

First, lock reception processing performed by the vehicle control unit 25 will be described with reference to the flowchart of FIG. 3. In the following drawings, the mobile terminal may be simply referred to as a terminal.

In S1, the vehicle control unit 25 receives a lock operation signal from the lock control switch 22. The lock operation signal is a signal output when a lock operation for performing the lock control is performed on the lock control switch 22.

In S2, the vehicle control unit 25 receives radio waves from the mobile terminal 12 existing in a range in which radio waves can be received.

In S3, the vehicle control unit 25 determines whether the mobile terminal 12 is inside or outside of the vehicle. Here, the vehicle control unit 25 determines whether each of the one or more mobile terminals 12 is inside or outside of the vehicle compartment by calculating the distance from the antenna 26 based on the intensity of radio wave received in S2.

In S4, the vehicle control unit 25 determines whether there is one or more mobile terminals 12 outside the vehicle compartment based on the result of S3. The term "outside the vehicle compartment" as used herein indicates an area outside the vehicle 2 and in the vicinity of the vehicle 2. When the vehicle control unit 25 determines that there is no mobile terminal 12 outside the vehicle compartment, the processing proceeds to S5 and responds for a case where there is no terminal outside the vehicle compartment. The vehicle control unit 25 may output an alarm indicating that the lock control could not be performed by the speaker without locking the lock mechanism 21 to the control ECU 23. In addition, a lamp mounted on the vehicle may be blinked. The processing of FIG. 3 is terminated after S5.

On the other hand, when the vehicle control unit 25 determines in S4 that the mobile terminal 12 is inside the vehicle compartment, the processing proceeds to S6.

In S6, the vehicle control unit 25 determines whether there is one or more mobile terminals 12 inside the vehicle compartment based on the result of S3. When the vehicle control unit 25 determines that there is no mobile terminal 12 in the vehicle compartment, the processing proceeds to S7 and performs the lock control. The processing of FIG. 3 is terminated after S7.

On the other hand, when the vehicle control unit 25 determines in S6 that the mobile terminal 12 is in the vehicle compartment, the processing proceeds to S8 and transmits an invalidation command to the mobile terminal 12. The invalidation command referred to here is a command for stopping the function of the mobile terminal 12 as a key device.

Subsequently, in S9, the vehicle control unit 25 performs the lock control. The processing of FIG. 3 is terminated after S9.

Note that S2, S3, and S6 correspond to processes as the determination unit 42.

1-2-2. Invalidation Processing

Figure 4:
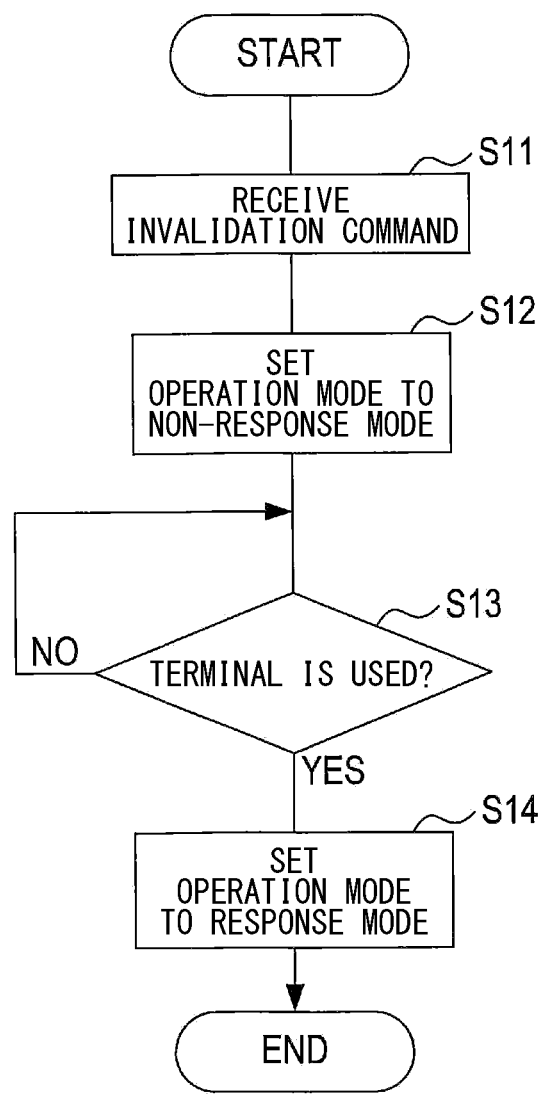
FIG. 4 is a flowchart showing an invalidation processing according to the first embodiment.

The invalidation processing performed by the terminal control unit 33 will be described with reference to the flowchart of FIG. 4.

Figure 3:
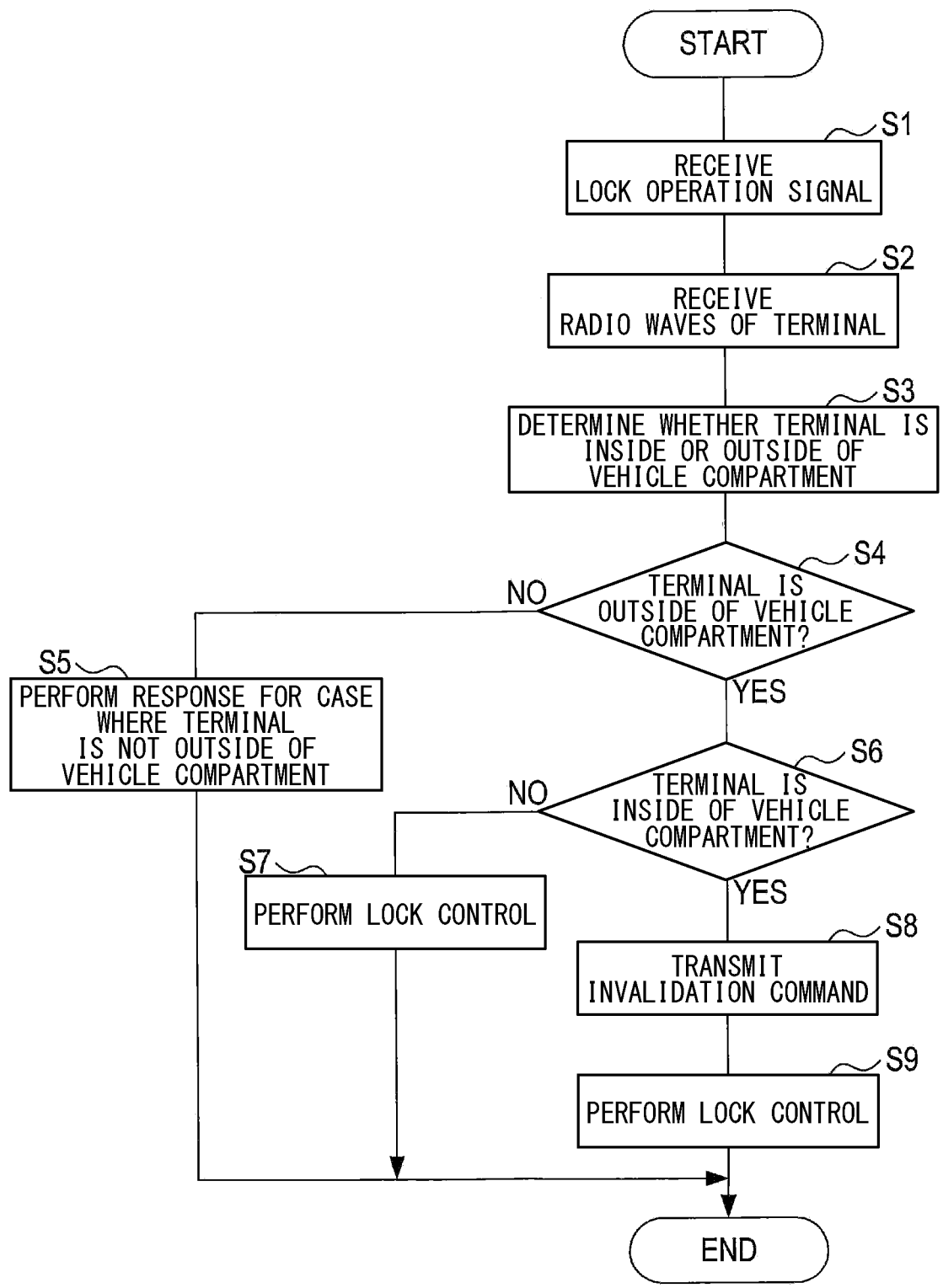
FIG. 3 is a flowchart showing a lock reception processing according to the first embodiment.

In S11, the terminal control unit 33 receives the invalidation command transmitted by the vehicle control unit 25 in the process of S8 in FIG. 3.

In S12, the terminal control unit 33 sets the operation mode to the non-response mode. The terminal control unit 33 sets the operation mode to either the response mode or the non-response mode, and transmits the permission signal in the response mode. The operation mode may be managed by a flag stored in the memory included in the terminal control unit 33.

In S13, the terminal control unit 33 determines whether the mobile terminal 12 is used after being set to the non-response mode in S12. When the terminal control unit 33 determines that the mobile terminal 12 is not used, the processing returns to S13 again. That is, the terminal control unit 33 waits until the mobile terminal 12 is used.

On the other hand, when the terminal control unit 33 determines that the mobile terminal 12 is used, the processing proceeds to S14 and sets the operation mode to the response mode. The processing of FIG. 4 is terminated after S14.

Note that S13 corresponds to a process as the detection unit 43.

1-2-3. Unlock Reception Processing

Unlock reception processing executed by the vehicle control unit 25 will be described with reference to the flowchart of FIG. 5.

In S21, the vehicle control unit 25 receives a unlock operation signal from the lock control switch 22. The unlock operation signal is a signal output when an unlock operation for performing the unlock control is performed on the lock control switch 22.

In S22, the vehicle control unit 25 transmits an unlock command to the mobile terminal 12. The unlock command corresponds to a predetermined operation signal transmitted by the in-vehicle device 11.

In S23, the vehicle control unit 25 determines whether the mobile terminal 12 responds, that is, whether a permission signal is received from the mobile terminal 12. The permission signal is a signal transmitted in the process of S33 of FIG. 6 to be described later.

When the vehicle control unit 25 determines in S23 that the mobile terminal 12 does not respond, the processing proceeds to S24 and determines whether a predetermined time has elapsed. When the vehicle control unit 25 determines that the predetermined time has not elapsed, the processing returns to S23 and determines whether the mobile terminal 12 responds again. That is, the vehicle control unit 25 waits for a predetermined time until the mobile terminal 12 responds. On the other hand, when the vehicle control unit 25 determined that the predetermined time has elapsed, the processing terminates the process of FIG. 5 without performing the unlock control.

On the other hand, when the vehicle control unit 25 determines that the mobile terminal 12 responds in S23, the processing proceeds to S25. The vehicle control unit 25 performs the unlock control, and then terminates the processing of FIG. 5.

1-2-4. Response Processing

Figure 6:
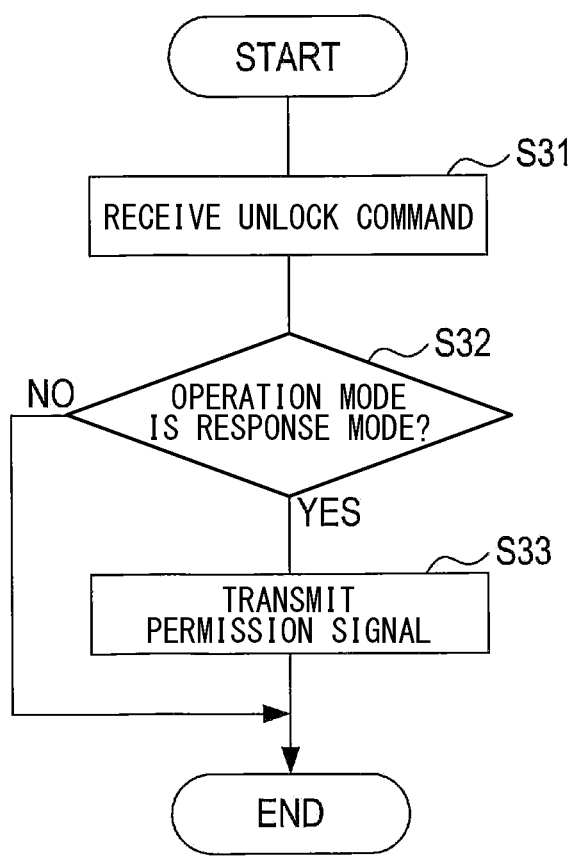
FIG. 6 is a flowchart showing a response processing according to the first embodiment.

The response processing performed by the terminal control unit 33 will be described with reference to the flowchart of FIG. 6.

Figure 5:
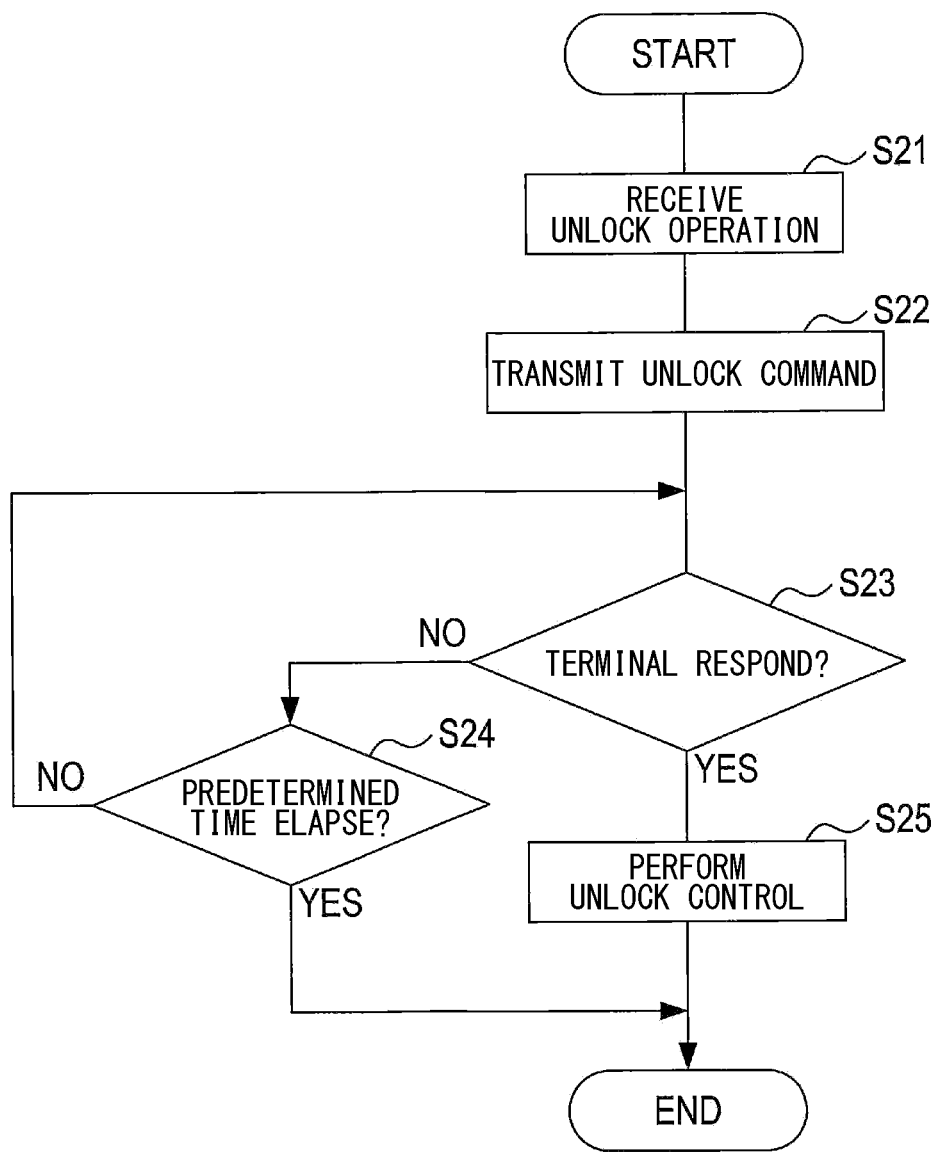
FIG. 5 is a flowchart showing an unlock reception processing according to the first embodiment.

In S31, the terminal control unit 33 receives the unlock command transmitted by the vehicle control unit 25 in the process of S22 in FIG. 5.

In S32, the terminal control unit 33 determines whether the operation mode is the response mode. When the terminal control unit 33 determines that the operation mode is not the response mode, the terminal control unit 33 terminates the processing of FIG. 6 without making any response. On the other hand, when the terminal control unit 33 determines that the response flag is on, the processing proceeds to S33 and transmits the permission signal to the in-vehicle device 11. The processing of FIG. 6 is terminated after S33.

Note that S12, S14, S32, and S33 correspond to processes as the transmission control unit 44.

In the present embodiment, the transmission control unit 44 corresponds to a system control unit. That is, when the determination unit 42 determines that the mobile terminal 12 exists in the vehicle compartment, the transmission control unit 44 controls the vehicle control system 1 to be incapable of satisfying the above-mentioned predetermined conditions for the lock control unit 41 to perform the unlock control. Further, when such a control is being performed and the detection unit 43 detects the use of the mobile terminal 12, the transmission control unit 44 controls the vehicle control system 1 to be capable of satisfying the predetermined conditions.

1-3. Effects

According to the first embodiment detailed above, the following effects may be obtained.

(1a) In the vehicle control system 1, when the determination unit 42 determines that the mobile terminal 12 is present in the vehicle compartment, the transmission control unit 44 stops transmitting the permission signal until the detection unit 43 detects the use of the mobile terminal 12. Therefore, the configuration can suppress unlocking of a third party using the mobile terminal 12 placed inside the vehicle compartment, and suppress a decrease in convenience due to an erroneous determination of the position of the mobile terminal 12.

(1b) In the vehicle control system 1, since the terminal control unit 33 of the mobile terminal 12 includes the detection unit 43, the mobile terminal 12 can determine whether to transmit the permission signal. Therefore, the processing load of the in-vehicle device 11 can be reduced.

2. Second Embodiment

2-1. Difference from the First Embodiment

Since the basic configuration of a second embodiment is similar to the first embodiment, the difference will be described below. Note that the same reference numerals as those in the first embodiment indicate the same configuration, and refer to the previous descriptions.

Figure 7:
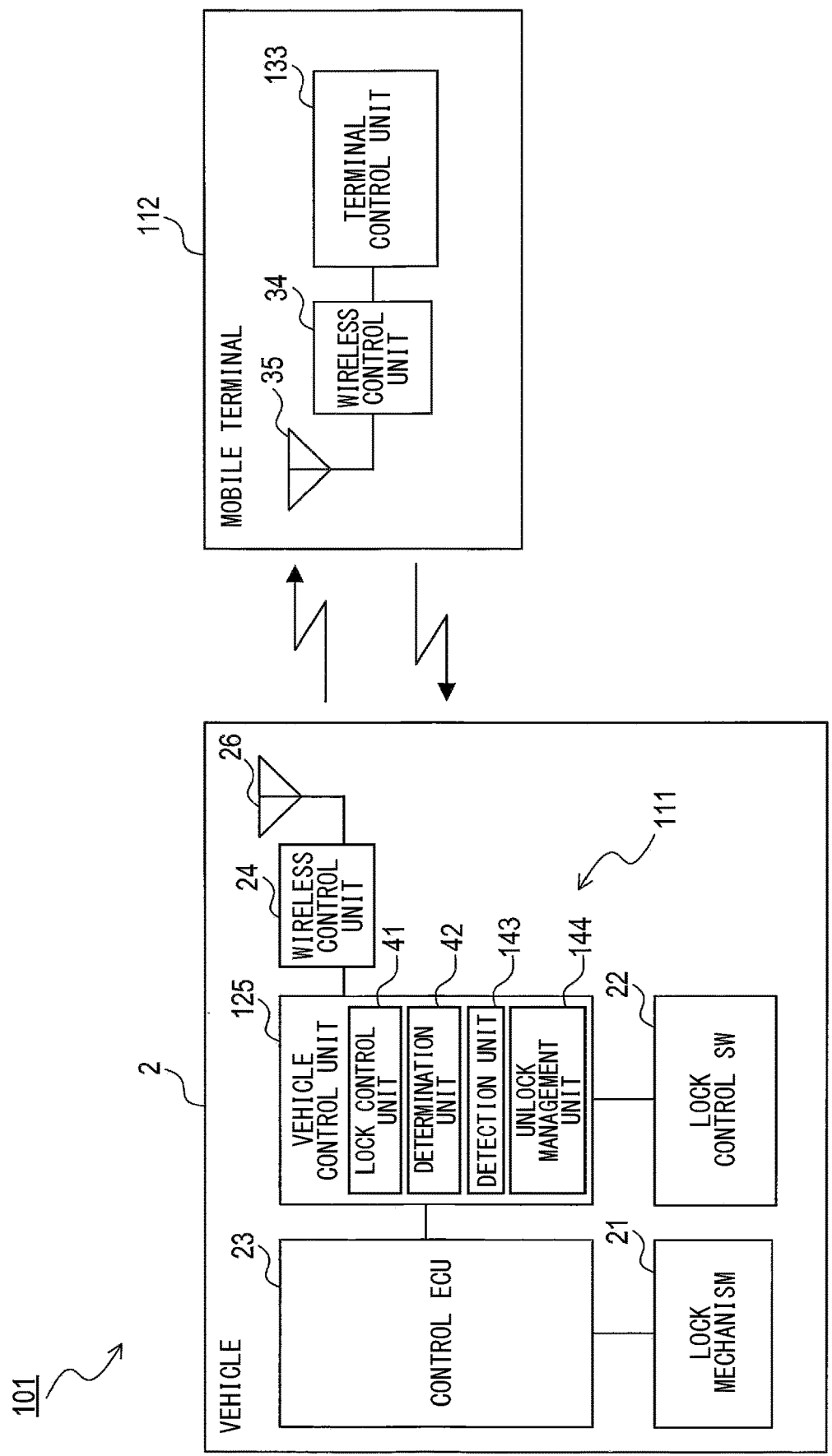
FIG. 7 is a block diagram showing a configuration of a vehicle control system according to a second embodiment.

In the first embodiment described above, the detection unit 43 for detecting the use of the mobile terminal 12 is provided in the mobile terminal 12. However, as shown in the vehicle control system 101 shown in FIG. 7, a vehicle control unit 125 may include a detection unit 143. That is, the vehicle control unit 125 of an in-vehicle device 111 may detect the use of a mobile terminal 112.

Further, the vehicle control unit 125 may include an unlock management unit 144. When the determination unit 42 determines that the mobile terminal 112 exists inside the vehicle compartment, the unlock management unit 144 controls the vehicle control system 101 such that the predetermined conditions are incapable of being satisfied. Further, when such a control is being performed and the detection unit 143 detects the use of the mobile terminal 112, the unlock management unit 144 controls the vehicle control system 101 to be capable of satisfying the predetermined conditions.

The unlock management unit 144 corresponds to a system control unit. The control of door unlock is performed by the lock control unit 41. By setting the operation mode, the unlock management unit 144 controls whether the unlock control can be performed by the lock control unit 41.

2-2. Processing

In the second embodiment, the vehicle control unit 125 of the in-vehicle device 111 performs similar processing to that in FIG. 5 when the unlock operation is performed. On the other hand, when the terminal control unit 133 of the mobile terminal 112 receives the unlock command, the terminal control unit 133 transmits a permission signal to the in-vehicle device 111.

2-2-1. Lock Reception Processing

Figure 8:
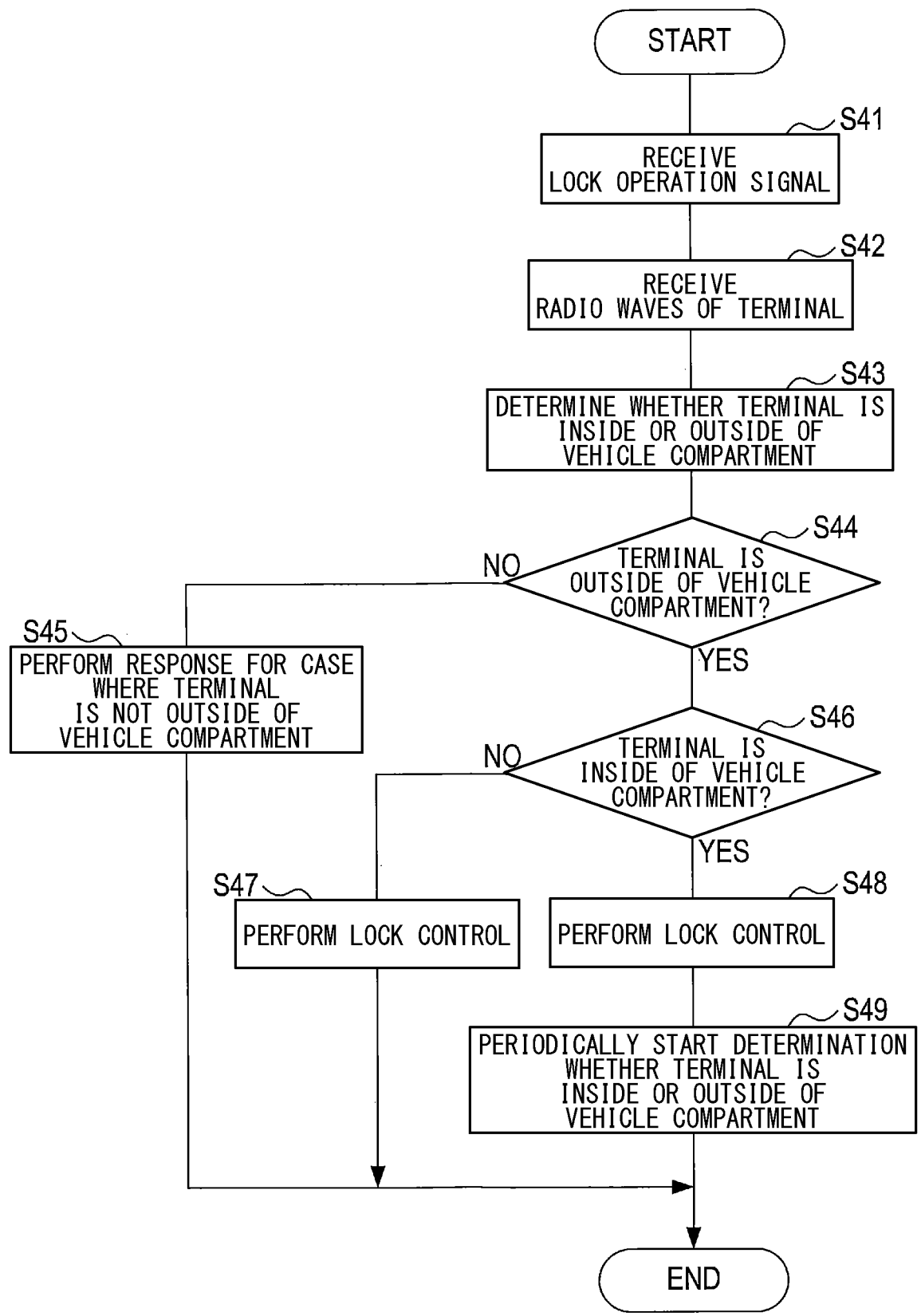
FIG. 8 is a flowchart showing a lock reception processing according to the second embodiment.

Lock reception processing executed by the vehicle control unit 125 of the second embodiment will be described with reference to the flowchart of FIG. 8. Since the processing in S41 to S47 in FIG. 8 is the same as the processing in S1 to S7 in FIG. 3, a description of the processing will be partially simplified.

When the vehicle control unit 125 determines in S46 that the mobile terminal 12 is inside the vehicle compartment, the processing proceeds to S48.

In S48, the vehicle control unit 125 performs the lock control. After that, the vehicle control unit 125 starts the periodic determination whether the mobile terminal 12 is inside or outside of the vehicle in S49, and then terminates the processing of FIG. 8.

2-2-2. Determination Processing of Inside or Outside of Vehicle

The determination processing of inside or outside of the vehicle compartment executed by the vehicle control unit 125 will be described with reference to the flowchart of FIG. 9. This processing is started in S49 of FIG. 8 and is performed at regular intervals.

The vehicle control unit 125 receives the radio waves of one or more mobile terminals 112 in S51, and determines in S52 whether each mobile terminal 112 is inside or outside the vehicle compartment.

In S53, the vehicle control unit 125 determines whether there is one or more mobile terminals 112 inside the vehicle compartment based on the result of S52. Here, by detecting that the mobile terminal 112 has moved from the vehicle compartment, the vehicle control unit 125 detects that the mobile terminal 112 has been carried by the user, that is, that the mobile terminal 112 has been used. When the vehicle control unit 125 determines that there is no mobile terminal 112 inside the vehicle compartment, in S54, the operation mode of the in-vehicle device 111 is set to a response mode that responds when the unlock operation is performed, and the processing of FIG. 9 is terminated. The response mode is an operation mode that causes the control ECU 23 to operate the lock mechanism 21 when the permission signal is received from the mobile terminal 112. The operation mode may be managed using a flag.

Figure 9:
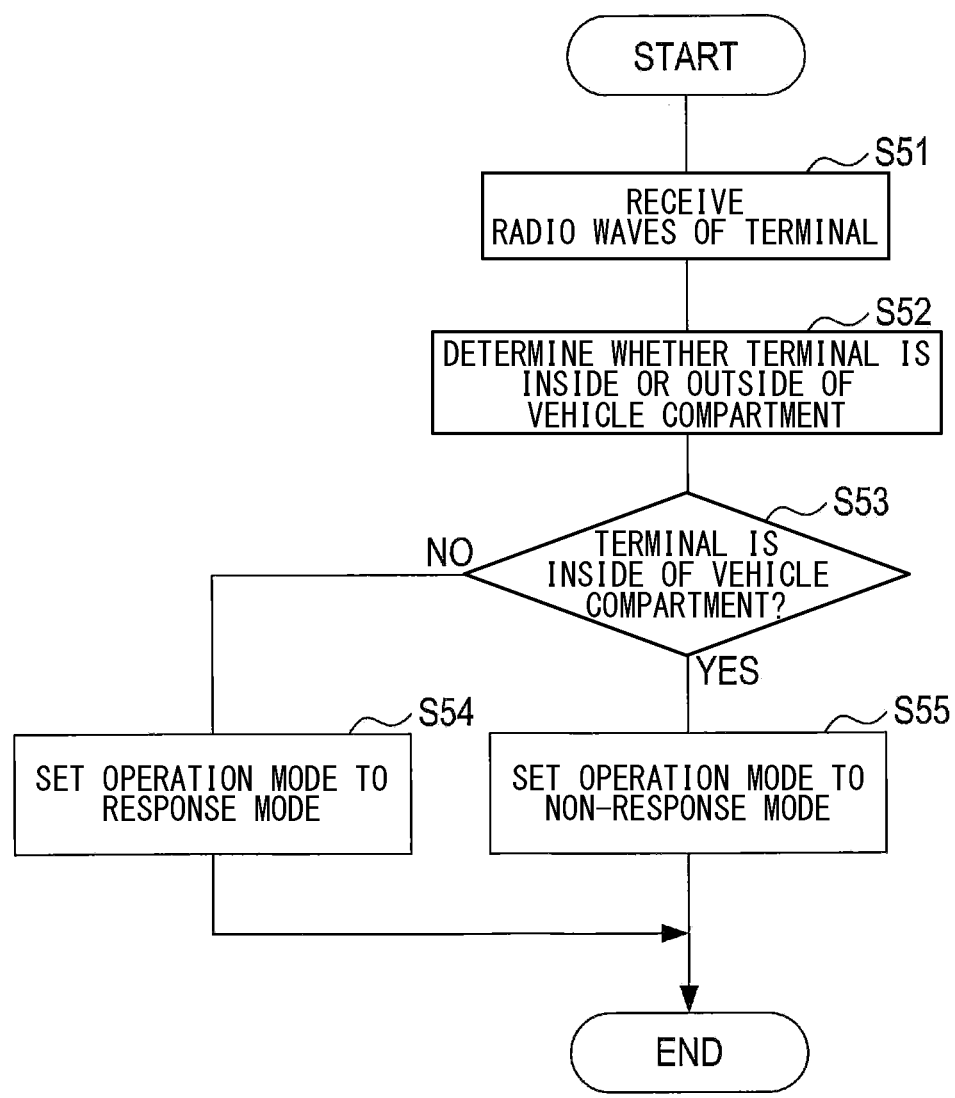
FIG. 9 is a flowchart of a determination processing of inside or outside of a vehicle compartment according to the second embodiment.

On the other hand, when the vehicle control unit 125 determines in S53 that the mobile terminal 112 is inside the vehicle compartment, the vehicle control unit 125 sets a non-response mode that does not respond when the operation mode of the in-vehicle device 111 is unlocked in S55, and the processing of FIG. 9 is terminated. The non-response mode is an operation mode that causes the control ECU 23 not to operate the lock mechanism 21 even when the permission signal is received from the mobile terminal 112.

Note that S51 to S53 correspond to processes as the detection unit 143.

2-2-3. Unlock Reception Processing

Figure 10:
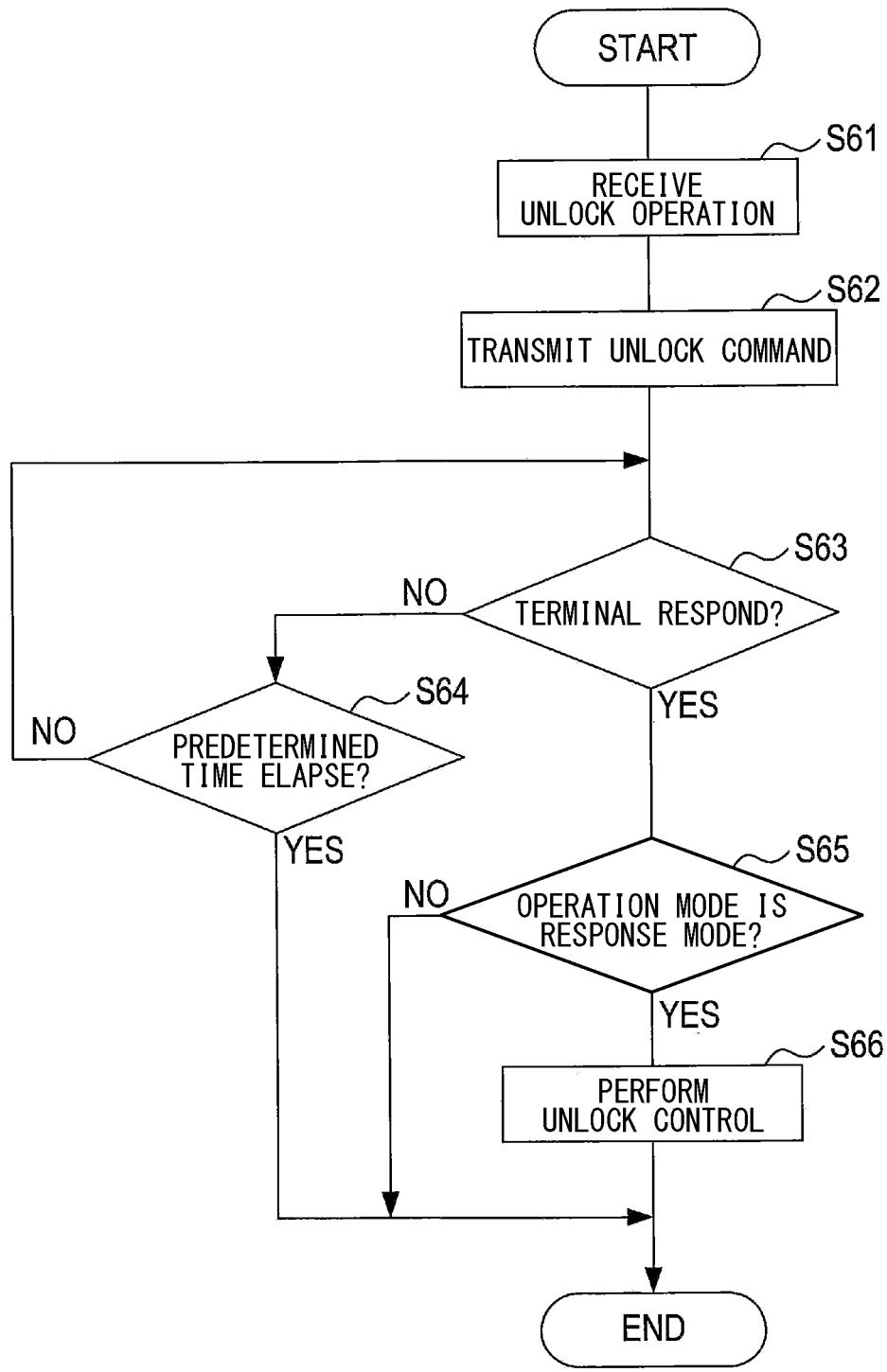
FIG. 10 is a flowchart showing an unlock reception processing according to the second embodiment.

Unlock reception processing performed by the vehicle control unit 125 of the second embodiment will be described with reference to the flowchart of FIG. 10. Since the processing in S61 to S64 in FIG. 10 is the same as the processing in S21 to S24 in FIG. 5, a description of the processing will be partially simplified.

The vehicle control unit 125 transmits the unlock command to the mobile terminal 112 in S62. When the vehicle control unit 125 determines in S63 that the mobile terminal 12 does not response, the processing proceeds to S64 and the vehicle control unit 125 waits until a predetermined time elapses. When the vehicle control unit 125 determines in S63 that the mobile terminal 12 respond, the processing proceeds to S65.

In S65, the vehicle control unit 125 determines whether the operation mode is the response mode. When the operation mode is not the response mode, that is, when the operation mode is the non-response mode, the processing of FIG. 10 is terminated without performing the unlock control. On the other hand, when the operation mode is the response mode, the processing proceeds to S66 and the unlock control is performed. The processing of FIG. 10 is terminated after S66.

2-3. Effects

According to the second embodiment detailed above, the following effects may be obtained.

(2a) In the vehicle control system 101, when the determination unit 42 determines that the mobile terminal 12 is present in the vehicle compartment, the lock control unit 41 does not perform the unlock control until the detection unit 43 detects the use of the mobile terminal. Therefore, the configuration can suppress unlocking of a third party using the mobile terminal 12 placed inside the vehicle compartment, and suppress a decrease in convenience due to an erroneous determination of the position of the mobile terminal 12.

(2b) In the vehicle control system 101, the in-vehicle device 111 detects the use of the mobile terminal 112. Therefore, the mobile terminal 112 can be realized with a simpler configuration than that of the first embodiment, and the processing load of the mobile terminal 112 can be reduced.

3. Other Embodiments

Although the embodiments of the present disclosure have been described above, the present disclosure is not limited to the embodiments described above, and various modifications can be made to implement the present disclosure.

(3a) In each of the above embodiments, a configuration having a smartphone function as a mobile terminal has been illustrated, but the present invention is not limited thereto. For example, various smart devices such as a smart watch capable of executing applications, or a general smart key not provided with a display or the like may be used as a mobile terminal.

(3b) In each of the above embodiments, the determination unit 42 is included in each in-vehicle device. However, a determination unit may be provided in a mobile terminal. The specific configuration of the determination unit in this case is not particularly limited. For example, the mobile terminal may calculate distance between the in-vehicle device and the mobile terminal based on the intensity of radio wave when communicating with the in-vehicle device and determine whether the mobile terminal is inside or outside the vehicle compartment based on the calculated distance.

(3c) The electronic control devices such as the vehicle control unit 25, the terminal control unit 33, and the vehicle control unit 125 described in the present disclosure and the method described in the present disclosure may be implemented by a special purpose computer which is configured with a memory and a processor programmed to execute one or more particular functions embodied in computer programs of the memory. Alternatively, the above described control device and the technique according to the present disclosure may be achieved by a dedicated computer provided by constituting a processor with one or more dedicated hardware logic circuits. Alternatively, the above described control device and the technique according to the present disclosure may be achieved using one or more dedicated computers constituted by a combination of the processor and the memory programmed to execute one or more functions and the processor with one or more hardware logic circuits. Further, the computer program may be stored in a computer-readable non-transitory tangible storage medium as instructions to be executed by a computer. The technique for realizing the functions of the respective units included in the above described control device does not necessarily need to include software, and all of the functions may be realized with the use of one or multiple hardware.

(3d) The multiple functions of one component in the above embodiment may be realized by multiple components, or a function of one component may be realized by multiple components. In addition, multiple functions of multiple components may be realized by one component, or a single function realized by multiple components may be realized by one component. A part of the configuration of the above embodiment may be omitted. At least a part of the configuration of the above embodiments may be added to or replaced with the configuration of another one of the above embodiments.

(3e) In addition to the in-vehicle device and the mobile terminal described above, a system including the in-vehicle device and the mobile device as a component, a program for causing a computer to function as the in-vehicle device and the mobile device, a semiconductor memory in which the program is recorded, and a non-transitory tangible storage medium, the communication relay method and the like may be provided by the present disclosure in various forms.

What is claimed is:

1. A vehicle control system comprising:
   an in-vehicle device that is mounted on a vehicle and configured to (i) control a lock mechanism that locks and unlocks a door of the vehicle, and (ii) cause the lock mechanism to unlock the door in response to a predetermined condition being satisfied;
   a mobile terminal configured to communicate with the in-vehicle device; and
   one or more processors configured to:
   determine whether the mobile terminal is present inside a vehicle compartment;
   detect whether the mobile terminal is used;
   control the vehicle control system not to satisfy the predetermined condition in response to determination that the mobile terminal is present inside the vehicle compartment; and
   enables the vehicle control system to satisfy the predetermined condition in response to detection that the mobile terminal is used when the one or more processors control the vehicle control system not to satisfy the predetermined condition.

2. The vehicle control system according to claim 1, wherein
   the one or more processors are configured to detect, as a use of the mobile terminal, at least one of an operation of the mobile terminal and a moving of the mobile terminal.

3. The vehicle control system according to claim 1, wherein the predetermined condition includes at least (i) a reception of a predetermined input operation to an operation unit mounted on the vehicle, and (ii) a reception, from the mobile terminal, of a permission signal that permits the lock mechanism to unlock the door.

4. A mobile terminal configured to communicate with an in-vehicle device mounted on a vehicle,
the in-vehicle device configured to:
control a lock mechanism that locks and unlocks a door of the vehicle; and
determine whether the mobile terminal is present inside a vehicle compartment,
the mobile terminal comprising a processor configured to detect whether the mobile terminal is used; and
transmit a permission signal that permits the lock mechanism to unlock the door in response to a predetermined transmission condition being satisfied, wherein
when the in-vehicle device determines that the mobile terminal is present inside the vehicle compartment, the processor stops transmitting the permission signal until the processor detects that the mobile terminal is used.

5. The mobile terminal according to claim 4, wherein
the in-vehicle device is configured to transmit a predetermined operation signal to the mobile terminal in response to a predetermined input operation being received by an operation unit mounted on the vehicle, and
the transmission condition includes at least a reception of the operation signal by the mobile terminal.

6. An in-vehicle device that is mounted on a vehicle and constitutes a vehicle control system with a mobile terminal configured to communicate with the in-vehicle device, the in-vehicle device comprising a processor configure to:
control a lock mechanism that locks and unlocks a door of the vehicle, and cause the lock mechanism to unlock the door in response to a predetermined condition being satisfied; and
determine whether the mobile terminal is present inside a vehicle compartment, wherein
the vehicle control system includes
a detection unit configured to detect whether the mobile terminal is used,
a system control unit configured to control the vehicle control system not to satisfy the predetermined condition in response to the processor determining that the mobile terminal is present inside the vehicle compartment, wherein
the system control unit enables the vehicle control system to satisfy the predetermined condition in response to the detection unit detecting that the mobile terminal is used when the system control unit controls the vehicle control system not to satisfy the predetermined condition.

7. The in-vehicle device according to claim 6, wherein
the processor includes the detection unit and the system control unit.

* * * * *